United States Patent
Ballard et al.

(10) Patent No.: US 10,924,435 B2
(45) Date of Patent: Feb. 16, 2021

(54) SYSTEM AND METHOD FOR PORT REDUCTION USING MULTIPLE CHASSIS LINK AGGREGATION GROUP FOR STACKED DEVICES

(71) Applicant: DELL PRODUCTS, LP, Round Rock, TX (US)

(72) Inventors: Lee Eric Ballard, Georgetown, TX (US); Wade Andrew Butcher, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 23 days.

(21) Appl. No.: 16/412,902

(22) Filed: May 15, 2019

(65) Prior Publication Data

US 2020/0366625 A1 Nov. 19, 2020

(51) Int. Cl.
| H04L 12/56 | (2006.01) |
| H04L 12/937 | (2013.01) |
| H04L 12/709 | (2013.01) |
| H04L 12/741 | (2013.01) |
| H04L 12/931 | (2013.01) |
| H04L 12/751 | (2013.01) |

(52) U.S. Cl.
CPC ............ *H04L 49/253* (2013.01); *H04L 45/02* (2013.01); *H04L 45/245* (2013.01); *H04L 45/74* (2013.01); *H04L 49/201* (2013.01); *H04L 49/65* (2013.01)

(58) Field of Classification Search
None
See application file for complete search history.

(56) References Cited

U.S. PATENT DOCUMENTS

| 7,849,098 B1* | 12/2010 | Scales ................. G06F 21/6218 707/781 |
| 8,996,683 B2* | 3/2015 | Maltz ...................... H04L 45/24 709/224 |
| 9,474,181 B2 | 10/2016 | Bailey et al. |
| 2012/0314715 A1* | 12/2012 | Janardhanan ......... H04L 45/245 370/402 |
| 2014/0133486 A1 | 5/2014 | Sivasankar et al. |
| 2014/0169176 A1 | 6/2014 | Brock |
| 2014/0307540 A1* | 10/2014 | Duda .................... H04L 41/082 370/220 |
| 2015/0092561 A1* | 4/2015 | Sigoure .................. H04L 49/50 370/236 |
| 2015/0309265 A1* | 10/2015 | Mehrvar .............. G02B 6/3558 398/51 |
| 2015/0312088 A1 | 10/2015 | Ramakrishnan et al. |
| 2015/0319083 A1* | 11/2015 | Grosser, Jr. ......... H04L 41/0672 370/218 |
| 2016/0149759 A1* | 5/2016 | Anumala .............. H04L 41/083 370/254 |

(Continued)

*Primary Examiner* — Brandon M Renner
(74) *Attorney, Agent, or Firm* — Larson Newman, LLP

(57) ABSTRACT

A system includes servers that are connected in series, and a top of rack (TOR) switch having a first TOR switch port and a second TOR switch port that are connected to a first end and a second end, respectively, of the series connected servers. A multi chassis link aggregation group may be established on the first TOR switch port and the second TOR switch port to transform the series connected servers into a single logical channel. A highest media access control address is determined from the servers to represent the single logical channel.

18 Claims, 6 Drawing Sheets

(56) References Cited

U.S. PATENT DOCUMENTS

| | | | |
|---|---|---|---|
| 2016/0212041 A1 | 6/2016 | Krishnamurthy | |
| 2016/0380801 A1* | 12/2016 | Xu | H04L 47/125 |
| | | | 370/254 |
| 2017/0257309 A1* | 9/2017 | Appanna | H04L 12/4633 |
| 2017/0289031 A1* | 10/2017 | Duda | H04L 12/4633 |
| 2017/0317892 A1* | 11/2017 | Tung | H04L 49/00 |
| 2017/0358111 A1* | 12/2017 | Madsen | G06T 11/206 |
| 2018/0176036 A1 | 6/2018 | Butcher et al. | |
| 2018/0302315 A1* | 10/2018 | Kamisetty | H04L 12/462 |
| 2018/0351766 A1* | 12/2018 | Koshinuma | H04L 41/0663 |
| 2019/0235851 A1* | 8/2019 | Vergara | G06F 8/60 |
| 2019/0245751 A1* | 8/2019 | Wong | H04L 45/122 |
| 2019/0246187 A1* | 8/2019 | Wong | H04B 10/40 |
| 2019/0363975 A1* | 11/2019 | Djernaes | H04L 45/24 |

* cited by examiner

SYSTEM AND METHOD FOR PORT REDUCTION USING MULTIPLE CHASSIS LINK AGGREGATION GROUP FOR STACKED DEVICES

FIELD OF THE DISCLOSURE

This disclosure generally relates to information handling systems, and more particularly relates to port reduction using multiple chassis link aggregation group for stacked devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A system includes servers that are connected in series, and a top of rack (TOR) switch having a first TOR switch port and a second TOR switch port that are connected to a first end and a second end, respectively, of the series connected servers. A multi chassis link aggregation group may be established on the first TOR switch port and the second TOR switch port to transform the series connected servers into a single logical channel. A highest media access control address is determined from the servers to represent the single logical channel.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols indifferent drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
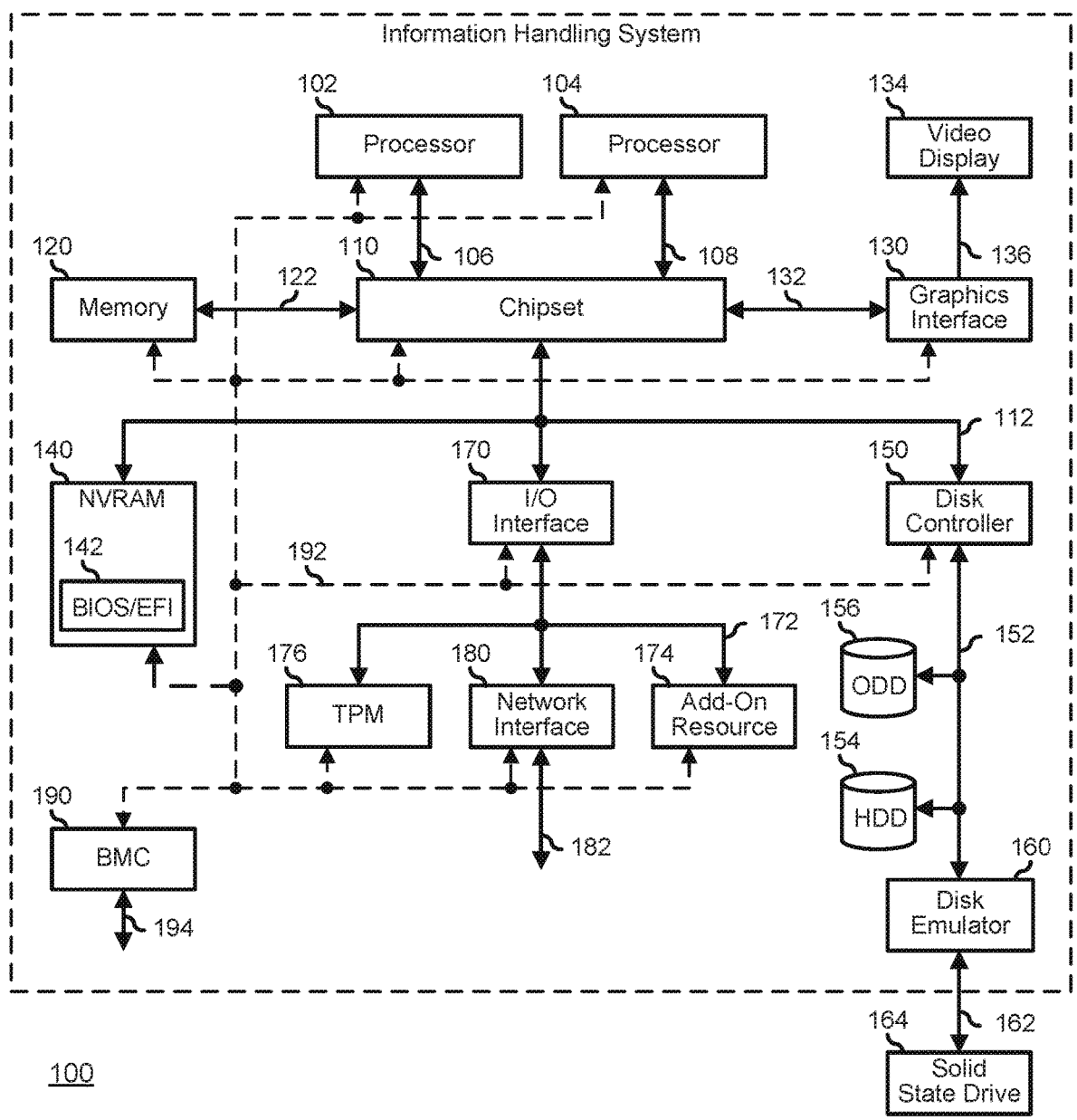
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, information handling system may be one of many hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

In an embodiment, stacked devices or servers may be formed from interconnected information handling systems that are installed on a rack. In this embodiment, the interconnection may be configured to optimize use of ports in the rack.

Figure 2:
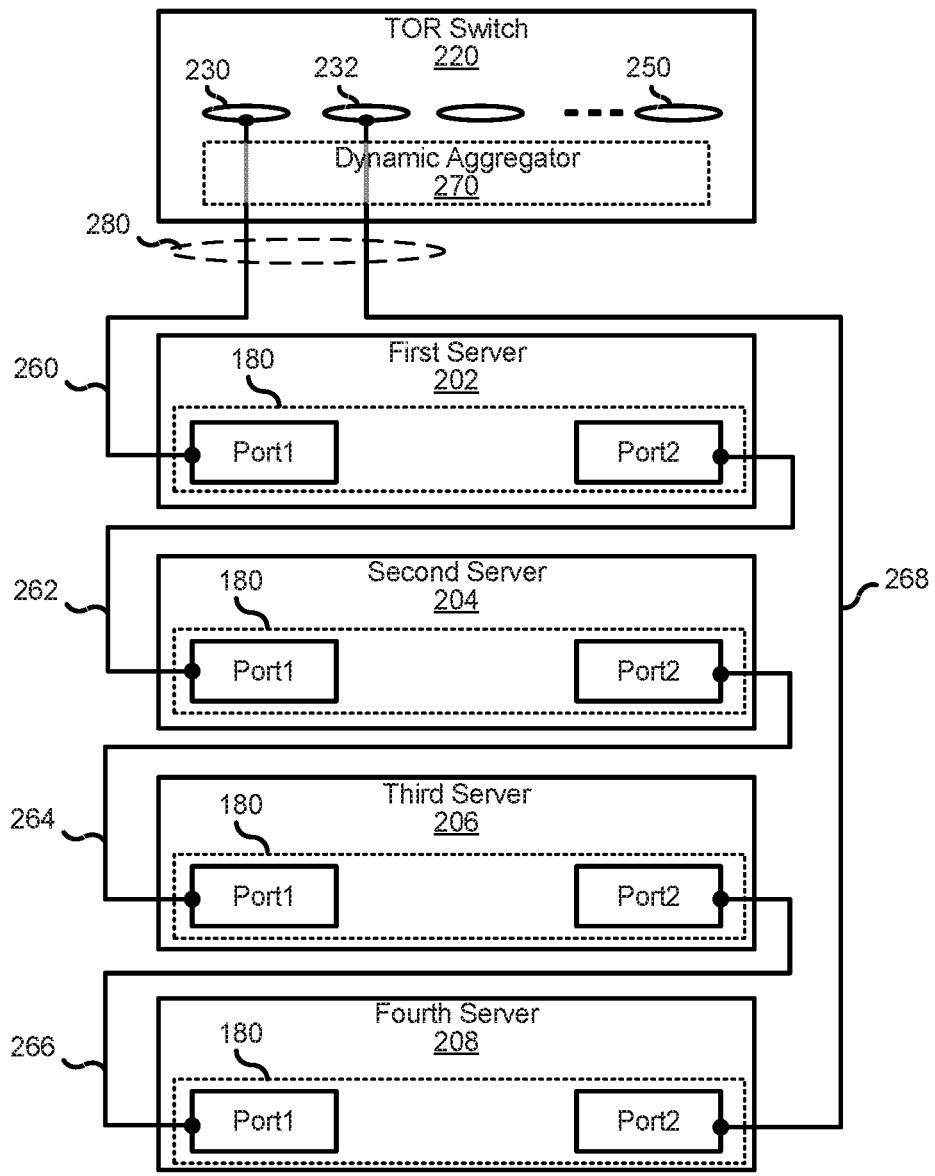
FIG. 2 is a block diagram of a server system supporting port reductions in multiple stacked servers, according to an embodiment of the present disclosure.

FIG. 2 shows a rear portion of a server system 200 including multiple stacked servers within the rack. The server system may include a first server 202, a second server 204, a third server 206, a fourth server 208, and a top of rack (TOR) switch 220. Each of these servers may include functions and components of the information handling system as described in FIG. 1. Furthermore, each of the servers 202-208 may include two NIC ports such as port1 and port2 that may facilitate server interconnection to TOR switch ports 230-250. The number of servers and the number of TOR switch ports presented are for ease of illustration and additional servers may be connected to the bottommost server and or additional ports may be added to the TOR switch. The TOR switch port is interchangeably referred to herein as the TOR server port that may provide a communication link between the stacked servers and other servers in another network or server systems.

In an embodiment, the first NIC port of the first server connects over line 260 to the first TOR server port 230, the first NIC port of the second server connects over line 262 to the second NIC port of the first server, the first NIC port of the third server connects over line 264 to the second NIC port of the second server, the first NIC port of the fourth server connects over line 266 to the second NIC port of the third server, and the second NIC port of the fourth server connects over line 268 to the second TOR server port 232. That is, the servers 202-208 are stacked together and are connected in series between the first and second TOR server ports to form a ring topology network. In this embodiment, a dynamic aggregator 270 of the TOR server may be configured to create a MCLAG 280 across the formed ring topology network. The created MCLAG includes aggregation of endpoints to prevent looping in the formed ring topology network. For example, the MCLAG is created on a first endpoint and a second endpoint. The first endpoint may include the first TOR server port and the connecting link 260 that connects the first TOR server port to the first server, which includes one end of the ring topology network. The second endpoint may include the second server TOR port and the connecting link 268 that connects the second TOR server port to other end of the series connected stacked server. In this example and upon aggregation of the two endpoints, these aggregated endpoints may be treated as one endpoint or a single logical channel even though the connecting links 260 and 268 are respectively connected to different physical servers.

In an embodiment, the dynamic aggregator 270 may include a hardware circuit that may facilitate the establishment of the MCLAG between two or more ports of the TOR server. The TOR server may act as a switch that includes multiple ports to facilitate transmission of data packets from one of the stacked servers of the formed ring topology to an outside network, or to facilitate reception of data packets from the outside network to the stacked server as its final destination. In this embodiment, the established MCLAG may prevent looping on the formed ring topology network and further optimizes bandwidth on each port of the TOR server.

For example, the TOR server utilizes one of its ports to flood a packet to the formed ring topology. In this example, a look-up table does not provide any information on where the destination MAC address of the packet resides, and as such hashing algorithm may be used to select which TOR server port is to be used for the packet. Assuming that the second TOR server port is selected, the data packet will flood the fourth server, third server, second server, first server, and the first TOR server port. The first TOR server port will block the flooding of the data packet back to the fourth server through the second TOR server port as this would generate a loop back. In another example, the fourth server is assumed to be the master server and it floods data packets to the first server through the third and second servers. In this other example, the second TOR server port may receive the data packet but it disregards or blocks the received data packet rather than looping it to the first server through the first TOR server port. In these examples, the established MCLAG prevents the loop that may occur during flooding of data packets because the first endpoint and the second endpoint are treated as single logical channel.

In an embodiment, the single logical channel may represent the stacked servers 202-208 that are connected in series to form the ring topology configuration. The single logical channel may include a logical address such as highest MAC address of the server that is found in the formed ring topology. In a case where additional servers are added to the ring topology configuration, the ring topology may still be represented by the single logical channel. In this embodiment, the maximum bandwidth on each TOR server port is maintained due to series configuration of the formed ring topology. That is, the bandwidth of the TOR server port is equal to the bandwidth of each connecting link in the series connected stacked servers. Furthermore, the use of the TOR server ports is optimized by using a minimal number of TOR server ports to support the same bandwidth. As opposed to non-series configuration such as when each stacked server is independently connected to different TOR server ports, this configuration does not form the ring topology and further uses a total of four TOR server ports to support the four stacked servers. In this case, the use of the TOR server ports is not optimized because at least two additional TOR server ports are required to support the same bandwidth.

In an embodiment and when the connecting link between two of the stacked servers of the ring topology breaks down, the established MCLAG is disabled and the use of the single logical channel is set aside. By setting aside the use of the single logical channel, the first TOR server port and the second TOR server port are configured as two separate TOR server ports. In this embodiment, forwarding database (FDB) modules on all NICs and the TOR switch are reset. Furthermore, the resulting clustered stacked servers may now communicate with one another through the first and second TOR server ports. In an embodiment and upon fixing of the broken connecting link, the dynamic aggregator may reestablish the MCLAG between the first and second TOR server ports. In this embodiment, the first TOR server port may no longer communicate data packets to the second TOR server port, or vice versa, and they are treated again as one logical channel. Furthermore, the FDB modules are configured to exchange protocol messages to learn endpoints and MAC addresses of the reestablished ring topology.

Figure 3:
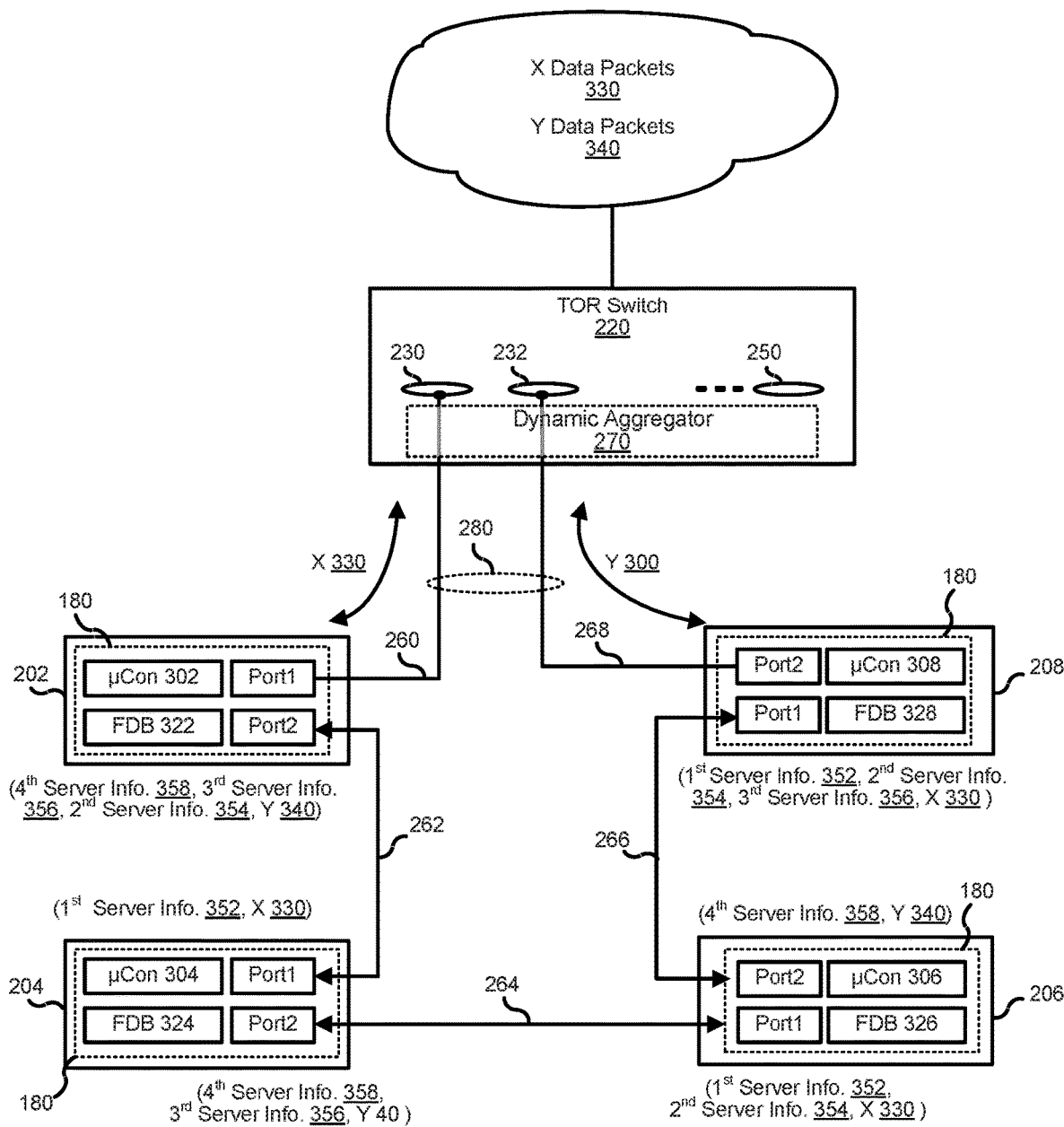
FIG. 3 is a block diagram of a network including an updating of forwarding database (FDB) module on each of multiple chassis link aggregation group (MCLAG) supported stacked servers, according to an embodiment of the present disclosure.

FIG. 3 is a block diagram of a network 300 including an updating of FDB module on each of the MCLAG supported stacked servers. In an embodiment, the stacked server s 202-208 may include respective NIC microcontrollers 302-308 and FDB modules 322-328. The FDB module may include a table that stores learned MAC addresses and ports that the MAC addresses were learned on. In this embodiment, each of the NIC microcontrollers may facilitate the updating of the corresponding FDB module to establish the MCLAG supported ring topology. The NIC microcontroller may further facilitate the determination of the servers that are disposed on each end of the formed ring topology, the obtaining of the highest MAC address that represents the single logical channel, and the assignment of the master server between the stacked servers. Furthermore, the NIC microcontroller may support the reorganization of the stacked servers in case of disconnected link that breaks down the formed ring topology. The NIC microcontrollers may be configured to perform these features without the help of the main processors such as processors 102 and 104.

In an embodiment, the TOR server port may facilitate the delivery of cloud data packets such X data packet 330 and Y data packets 340 to the stacked servers using deterministic hash algorithm. That is, traffic for the X and Y data packets are not dynamically assigned across member links of the MCLAG but instead, load balancing through the hash algorithm is implemented to deliver the data packets to their respective final destinations. The load balancing may provide selection of a particular TOR server port to be used so that MAC flapping is avoided such as when the NIC microcontroller sees data packets from one source MAC address through both TOR server ports rather than the selected TOR server port. In this embodiment, the deterministic hash algorithm may be fed with parameters such as source MAC address of the X or Y data packets and source virtual local area network (VLAN) identifiers of the X or Y data packets. The source MAC address and the VLAN identifiers may be used by the TOR server port in cases where the NIC microcontrollers are configured to use these MAC address and VLAN identifiers in learning or the updating of its FDB. Upon determination of the TOR server port, the X or Y data packet is delivered to its final destination through the selected TOR server port.

In an embodiment, the MCLAG supported ring topology may be established by having the X or Y data packet flood the servers 202-208 through the selected TOR server port. In this embodiment, a server information of the stack server that distributes the data packet to the adjacent stack server in a particular direction is associated with the data packet. The server information may include MAC address of the forwarding stack server, MCLAG status, connecting link status, port that received the MAC address, and the like. For example, the first TOR server port is selected by the hash algorithm for the flooding of the X data packet. In this example, the first server receives the X data packet including its source MAC address and source VLAN identifier through the first TOR server port. In response to receiving of the X data packet, the first server forwards the X data packet together with associated first server information 352 to the second server. The second server in turn distributes the X data packet, the first server information 352, and associated second server information 354 to the third server. The third server receives the X data packet together with the associated server information and forwards them to the fourth server including its third server information 356. Thus, the fourth server including its fourth server information 358 may update its FDB module based on the received first, second and third server information that were associated with the X data packet. The updated FDB module may include respective MAC addresses of the forwarding stack servers, ports that received the MAC addresses, connecting link status of the distributing stack servers, details of the X data packet such as the source MAC address and the VLAN identifiers, NIC port that received the X data packet, and the like.

Similarly, the second TOR server port may be selected by the hash algorithm for the flooding of the Y data packet. In this case, the fourth server receives the Y data packet and its MAC address and VLAN identifiers through the second TOR server port. In response to receiving of the Y data packet, the fourth server forwards the Y data packet together with associated fourth server information 358 to the third server. The third server in turn distributes the Y data packet, the fourth server information 358, and its third server information 356 to the second server. The second server receives the Y data packet together with the associated server information and forwards them to the first server including its second server information 354. Thus, the first server including its first server information 352 may update its FDB module based on the received Y data packet and the second, third, and fourth server information that were associated with the Y data packet. Furthermore, the second and stack servers may also update their respective FDB modules during the flooding of the X and Y data packets through the first and second TOR server ports, respectively.

In an embodiment and upon the flooding of the stacked servers by the X and Y data packets in different directions, the corresponding stack server NIC microcontroller may be configured to identify location and status of each stack server within the ring topology. In this embodiment, the MCLAG is established and the use of optimal number of TOR sever ports is achieved. For example, NIC microcontrollers 302 and 308 may identify that their respective servers are disposed on each end of the series connected stacked servers. In this example, the identification may be based on the server information in the updated FDB modules. In another example, each NIC microcontroller may determine the MAC addresses of the other stacked servers and the server ports that they are connected to based on the received server information. In this other example, the server with the highest MAC address may be selected as the master server or master node and the MAC address of the master node may be used as the single logical channel for the established MCLAG supported ring topology.

Figure 4:
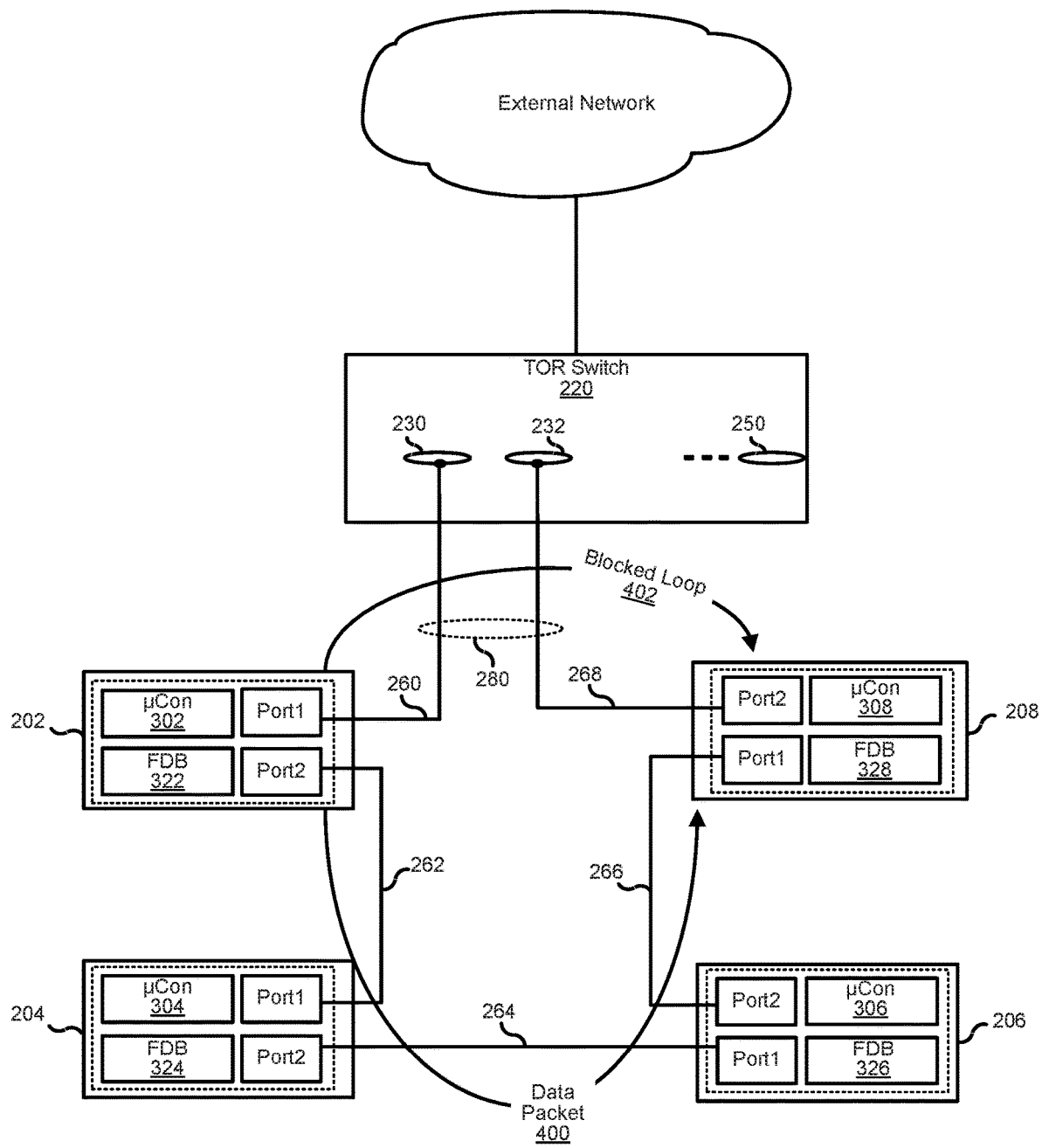
FIG. 4 is a block diagram showing prevention of loop occurrence in a ring topology configuration, according to an embodiment of the present disclosure.

FIG. 4 is a block diagram that shows the loop prevention for the MCLAG supported ring topology. In an embodiment and when a particular stacked server is forwarding data packets to another stacked server, the data packet may be forwarded through the connecting link between the two stacked servers but not through the TOR server ports. For example, the first server sends data packets 400 to the fourth server as the final destination. In this example, the data packets may pass through the connecting link 262 and received by the second server. The second server NIC microcontroller may determine that it is not the final destination, and as such forwards the data packet to the third server through the connecting link 264. The third server NIC microcontroller similarly determines that it is not the final destination, and as such forwards the data packet to the fourth server through the connecting link 266. The fourth server NIC microcontroller determines that its MAC address includes the final destination, and as such the fourth server may send an acknowledgement response to the first server through the same connecting links that transmitted the data packet. In this embodiment, the fourth server receives the data packet that travelled through multiple hops rather than through the single hope via the TOR server ports. In this case, the aggregation of the connecting links 260 and 268 generates blocked loop 402 to prevent flooding of data packets between the distributing first server and the receiving fourth server through the TOR port servers.

In the case where one of the connecting links in the formed ring topology is broken such as when the TOR server port stops seeing proposed link aggregation control protocol (LACP) messages from the NIC microcontrollers, then the TOR server ports may be treated as designated ports and the established MCLAG is set aside. In this case, the clustered stacked servers may communicate through the TOR server ports until the reestablishment of the MCLAG.

Figure 5:
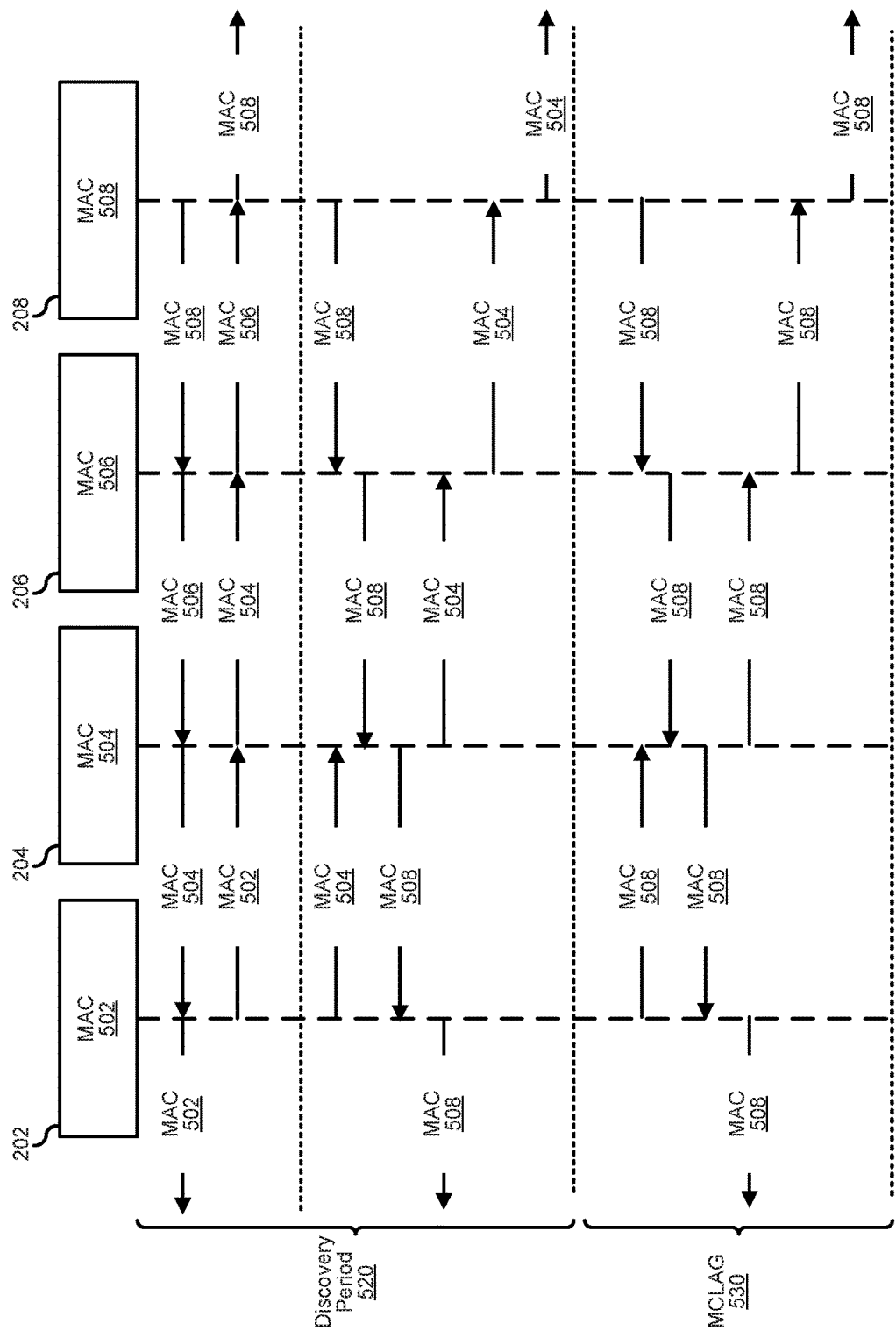
FIG. 5 is a block diagram showing a sequence of identifying a stacked server with a highest media access control (MAC) address in a server system, according to an embodiment of the present disclosure.

FIG. 5 is a block diagram that shows a sequence of identifying the highest MAC address within the formed ring topology. In an embodiment, the MCLAG establishment may be performed during server system initialization. In another embodiment, the MCLAG may be reestablished after the disconnected link has already been fixed. In these embodiments, the highest MAC address selected from MAC addresses 502-508 of the respective stacked servers 202-208 may be utilized to represent the single logical channel for the established MCLAG.

In an embodiment, each of the stacked servers may exchange protocol messages to build their respective topology databases within a predetermined discovery period 520. At the expiration of the discovery period, MCLAG 530 signifies that the MCLAG has been established. In this embodiment, the exchange of protocol messages may include updating of the FDB module and the determination by the NIC microcontroller of the highest MAC address to represent the MCLAG supported ring topology. The predetermined discovery period may be based upon a particular time period, or based upon number of iterations that one stack server has been receiving and forwarding the same identified highest MAC address. For example, the NIC microcontroller facilitates forwarding of an identified higher MAC address that is derived from a comparison between the received MAC address and the MAC address of the receiving server. In this example, the NIC microcontroller may forward the same MAC address for a number of iterations. After a predetermined iteration threshold such as receiving and forwarding of the same MAC address three times, the MCLAG may be deemed established.

In an embodiment and during the discovery period, a stack server NIC microcontroller may facilitate the blocking of forward traffic from the server's port until negotiation for the establishment of the MCLAG has been completed. For example, the MCLAG mode is enabled on the fourth server and the fourth server send a link layer discovery protocol (LLDP) packet that includes a header followed by a variable number of information elements known as type length and value (TLV). The type in the TLV identifies what kind of information being sent while the length and value indicate the length of the information string and the actual information sent, respectively. In this example, the LLDP TLV may include a proposed LACP actor system MAC address 508 which is the base factory MAC address of the fourth server. In this example still, the fourth server NIC microcontroller will block the forwarding of the traffic from one port to another port until exchanging of the protocol messages negotiation is complete.

When the third server receives the LLDP TLV from the fourth server, the third server may send its own MAC address 506 and associated server information to the second server. Similarly, the second server receives the third server MAC address and the associated server information, and the second server sends its own MAC address 504 and associated server information to the first server, and so on. In an embodiment, the NIC microcontroller of each stacked server may be able to compare the received MAC addresses and based from the determined highest MAC address, each stack server will receive and distribute the same highest MAC address at the expiration of the discovery period. For example, the MAC address 508 includes the highest MAC address between the stacked servers. In this example and at the end of the discovery period, each stacked server is receiving and forwarding the same MAC address to adjacent stack server. In this example still and to speed up convergence, the third server may immediately relay the updated LLDP TLVs as they arrive adopting the LLDP timing of the forwarding fourth server. However, in a case where there are no TOR server ports and all the NICs in the stacked servers enter this relay mode, a timer such as three times LLDP transmit interval is implemented to prevent a situation where the exchanging of protocol messages or algorithm would get stuck.

In a case where an endpoint NIC, which is only receiving the MCLAG TLV on one port, is receiving the same MCLAG Actor MAC that it is sending, and it stays the same for a number of consecutive LLDP exchanges, then the MCLAG is deemed established and it will start transmitting LACP. For example, the endpoint NIC has been receiving and sending the same MCLAG actor for three consecutive times. In this example, the MCLAG is established. Furthermore, when the endpoint NIC learns device information about its LACP partner, the endpoint NIC will package that information in another LLDP TLV that will be relayed around the stacked devices towards the other endpoint NIC. In an embodiment, the server NICs will start forwarding normal traffic from one port to the other based on its learned MAC FDB when the LACP partner has set its collecting and distributing flags. In this embodiment and in case where there is a LACP partner mismatch or if no LACP information is received from the TOR server, then only the master endpoint NIC of the ring topology will go into forwarding mode.

In an embodiment, a periodic LLDP keep alive packet is sent from the determined master server to the other link partner NIC. In a case where any NIC in the ring topology detects broken connecting link, then the NIC will immediately send a link down notification via LLDP through the other port to notify other members of the ring. When the master and the other link partner NIC detect failure by either method, they will stop sending LACP to the TOR server. Furthermore, when the NICs that are implementing the MCLAG stop sending the LACP to the TOR server port, then the TOR server will toggle from participating in the LAG to acting as designated ports. This will reset the FDB on the TOR server and the FDBs on all the stacked servers. With this broken connecting link, all the locations of endpoints and MAC addresses will be learned according to the new topology. Periodic LLDP advertising MCLAG may still be sent but the presence of a port down will hold the ring in failover mode until the link is re-established and then the MCLAG will be re-established as before. The failover mode in this case may include treating the first TOR server port separately from the second TOR server port.

Figure 6:
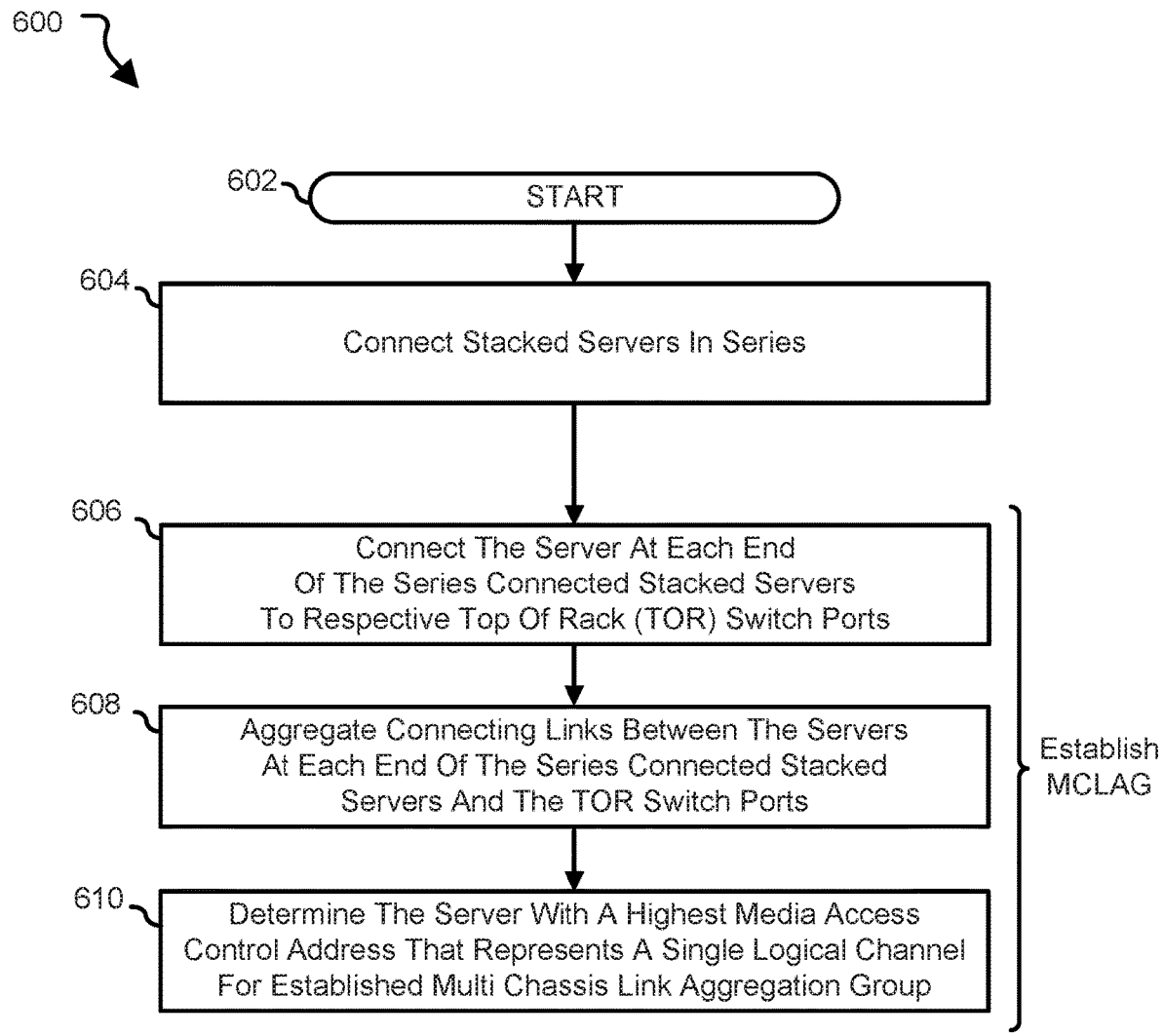
FIG. 6 is a flow chart showing a method of optimizing top of rack switch ports in the server system, according to an embodiment of the present disclosure.

FIG. 6 is a flowchart showing a method 600 of optimizing TOR server ports in the server system, starting at block 602. At block 604, connecting the stacked servers 202-208 in series. Blocks 606-610 may include steps for establishing of the MCLAG where the established MCLAG prevents looping in the series connected servers by blocking the data packet that passes between TOR switch ports. For example and at block 606, the server disposed at each end of the series connected stacked servers are connected to respective TOR server ports. In this example, the first and second TOR server ports are respectively connected by a connecting link to each end of the series connected stacked servers. These connecting links are aggregated by the TOR server at block 608 to transform the series connected stacked servers into single logical channel. At block 610, the stack servers may exchange protocol messages to determine the server with the highest MAC address. The highest MAC address may be utilized to represent the single logical channel for the established MCLAG.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware.

An information handling system can also include one or more computer-readable medium for storing machine-executable code, such as software or data. Additional elements of an information handling system can include one or more storage devices that can store machine-executable code, one or more communications ports for communicating with external devices, and various I/O devices, such as a keyboard, a mouse, and a video display. An information handling system can also include one or more buses operable to transmit information between the various hardware elements.

In accordance with various embodiments of the present disclosure, the methods described herein may be implemented by software programs executable by a computer system. Further, in an exemplary, non-limited embodiment, implementations can include distributed processing, object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A server system, comprising:
a plurality of servers that are connected in series; and
a top of rack (TOR) switch including a first TOR switch port and a second TOR switch port that are connected to a first end and a second end, respectively, of the series connected servers, wherein a multi chassis link aggregation group (MCLAG) is established on the first TOR switch port and the second TOR switch port to transform the series connected servers into a single logical channel, wherein a highest media access control (MAC) address is determined from the servers to represent the single logical channel, wherein the servers include respective network identification card (NIC) microcontrollers configured to exchange protocol messages to determine the server with the highest MAC address, wherein the NIC microcontroller receives a forwarded MAC address, determines a higher MAC address between the received forwarded MAC address and the MAC address of the receiving server, and forwards the determined higher MAC address to an adjacent server.

2. The server system of claim 1, wherein the establishing of the MCLAG includes blocking of a data packet that passes between the first TOR switch port and the second TOR switch port.

3. The server system of claim 1, wherein the NIC microcontrollers determine the highest MAC address within a discovery period.

4. The server system of claim 1, wherein the receiving and forwarding of the same MAC address by the adjacent server for a predetermined iteration threshold indicates the establishment of the MCLAG.

5. The server system of claim 1, wherein a bandwidth of the TOR switch ports is equal to the bandwidth of each connecting link in the series connected servers.

6. The server system of claim 1, wherein the established MCLAG is set aside when a connecting link in the series connected servers is broken.

7. The server system of claim 1, wherein a data packet passes between the first TOR switch port and the second TOR switch port when the MCLAG is set aside.

8. The server system of claim 7, wherein the MCLAG is reestablished upon fixing of the broken connecting link.

9. A method comprising:
connecting a plurality of servers in series;
connecting a first top of rack (TOR) switch port and a second TOR switch port to a first end and a second end, respectively, of the series connected servers;
establishing, by a TOR switch, a multi chassis link aggregation group (MCLAG) on the first and second TOR switch ports, wherein the established MCLAG transforms the series connected servers into a single logical channel, wherein a highest media access control (MAC) address is determined from the servers to represent the single logical channel;
setting aside the established MCLAG when a connecting link in the series connected servers is broken; and
reestablishing the MCLAG upon fixing of the broken connecting link.

10. The method of claim 9, wherein the establishing of the MCLAG includes blocking of a data packet that passes between the first TOR switch port and the second TOR switch port.

11. The method of claim 9, wherein the servers include respective network identification card (NIC) microcontrollers configured to exchange protocol messages to determine the server with the highest MAC address.

12. The method of claim 11, wherein the NIC microcontrollers determine the highest MAC address within a discovery period.

13. The method of claim 9, wherein a bandwidth of the TOR switch ports is equal to the bandwidth of each connecting link in the series connected servers.

14. The method of claim 9, further including load balancing through use of a hash algorithm to select the TOR switch port that facilitates receiving of external data packets.

15. A method comprising:
connecting a plurality of servers in series;
connecting a first top of rack (TOR) switch port and a second TOR switch port to a first end and a second end, respectively, of the series connected servers; and
establishing, by a TOR switch, a multi chassis link aggregation group (MCLAG) on the first and second TOR switch ports, wherein the established MCLAG transforms the series connected servers into a single logical channel, wherein a network identification card (NIC) microcontroller of a server receives a forwarded MAC address, determines a higher MAC address between the received forwarded MAC address and the MAC address of the receiving server, and forwards the determined higher MAC address to an adjacent server, wherein a highest media access control (MAC) address is determined from the servers to represent the single logical channel, wherein the MCLAG is set aside when one connecting link in the series connected servers is broken.

16. The method of claim 15, wherein the establishing of the MCLAG includes blocking of a data packet that passes between the first TOR switch port and the second TOR switch port.

17. The method of claim 15, wherein the servers include respective network identification card (NIC) microcontrollers configured to determine the server with the highest MAC address by exchanging protocol messages.

18. The method of claim 15, wherein the first TOR switch port is treated as a separate port from the second TOR switch port when the MCLAG is set aside.

* * * * *